United States Patent
Vetne et al.

(10) Patent No.: US 6,234,420 B1
(45) Date of Patent: May 22, 2001

(54) STRING FEEDING DEVICE FOR SUPPORTING PLANTS

(76) Inventors: Erik S. Vetne, 3715 Beckley, Battle Creek, MI (US) 49075; Wayne Swafford, 8905 B Drive South, Battle Creek, MI (US) 49033

( * ) Notice: Subject to any disclaimer, the term of this patent is extended or adjusted under 35 U.S.C. 154(b) by 0 days.

(21) Appl. No.: 09/434,692

(22) Filed: Nov. 5, 1999

(51) Int. Cl.[7] .......................... B65H 16/00; A01G 17/06
(52) U.S. Cl. ...................... 242/588.2; 242/419; 242/566; 242/588.3; 47/46
(58) Field of Search ................................ 242/419, 419.4, 242/566, 588.2, 588.3; 47/1.01, 44, 46

(56) References Cited

U.S. PATENT DOCUMENTS

| | | |
|---|---|---|
| 1,040,740 | 10/1912 | Niswonger . |
| 1,626,545 | 4/1927 | March . |
| 3,333,786 | 8/1967 | Mitchell ............................... 242/146 |
| 4,945,674 | 8/1990 | Alexandrian et al. ................ 47/1.01 |
| 5,799,438 | 9/1998 | Rodgers ................................... 47/46 |

*Primary Examiner*—John Q. Nguyen
(74) *Attorney, Agent, or Firm*—Dykema Gossett PLLC

(57) ABSTRACT

A string feeding device and method for dispensing string is provided. The string feeding device may be used to dispense string between adjacent stakes to support plants disposed between the stakes. The string feeding device includes a string container disposed about a longitudinal axis and a longitudinally extending tube. The tube has a first end and a second end with the first end being fixedly attached to the string container. Further, the tube includes a first hole extending through a side of the tube. String is fed from the string container through the first hole in the side of the tube and is further fed through an interior of the tube to thereby exit the second end of the tube.

20 Claims, 2 Drawing Sheets

STRING FEEDING DEVICE FOR SUPPORTING PLANTS

BACKGROUND OF THE INVENTION

1. Field of the Invention

The present invention relates to a device and a method for dispensing string. In particular, the present invention relates to a device and a method for dispensing string between stakes to support vegetable plants dispersed between the stakes.

2. Disclosure of Related Art

Vegetable plants, such as tomato plants, require external support to maintain the continuous upward growth of the plants. When the plants produce vegetables, the increased weight of the vegetables may urge the plants closer to the ground. Further, when plants bend over so the vegetables contact the ground, the vegetables and even the plants become more susceptible to decay due to ground moisture and damage from insects. It is well known to support vegetable plants using stakes dispersed along a row of the plants. When utilizing stakes, string may be tied between the stakes on each side of the vegetable plants to support the plants. Further, a device for dispensing string between the stakes is known.

The known device for dispensing string utilizes a solid pole, a detached string container, and a ball of string disposed within the string container. The pole includes a tip member having a hole extending therethrough, and a plurality of brackets disposed longitudinally along the pole. Each of the brackets has an eyelet for string to be fed therethrough. String from the ball of string is fed from the string container through the brackets on the pole and further through the hole in the tip member. The device is utilized by tying the string which exits the hole in the tip member to a first stake. The device is further utilized by dispensing string between adjacent stakes and by encircling successive stakes with string by moving the tip member in a circular pattern around each successive stake. However, the known string feeding device suffers from several drawbacks. First, the string being fed from the known device may become entangled within the string container since the ball of string tumbles freely within the container. Second, because the known device feeds string through the plurality of brackets on the outside of the pole, the string may become entangled with plants that come into contact with the string extending along the pole. Third, the string may become entangled around the tip member when the tip member is moved in a circular pattern around the stakes. Once the string becomes entangled, a workman must untangle the string before dispensing any further string.

There is thus a need for a string feeding device that minimizes and/or eliminates string entanglement within a string container, along the exterior of the device, and at the dispensing end of the device.

SUMMARY OF THE INVENTION

The present invention provides a device and a method for dispensing string between stakes in a field or a garden.

An object of the present invention is to provide a device and a method for dispensing string between stakes that minimizes string entanglement at the dispensing end of the device.

A string feeding device for dispensing string in accordance with the present invention includes a string container being disposed about a longitudinal axis and a longitudinally extending tube attached thereto. The string container may be configured to allow string to be fed from the center of the spool of string held within the string container. The tube has a first end and a second end with the first end being fixedly attached to the string container. Further, the tube includes a first hole extending through a side of the tube. String is fed from the string container through the first hole in the side of the tube and is further fed through an interior of the tube to thereby exit the second end of the tube.

A method of dispensing string between first and second stakes to support plants in accordance with the present invention includes the step of providing a string container disposed about a longitudinal axis. The method further includes the step of providing a generally longitudinally extending tube fixedly attached to the string container. The tube includes a first hole extending through a side of the tube. The method further includes the step of providing a spool of string disposed within the string container. The method further includes the step of feeding string from the spool of string through the first hole extending through the tube. The method further includes the step of feeding the string through the interior of the tube to thereby exit a first end of the tube. The method further includes the step of tying the string to the first stake. The method still further includes the step of dispensing the string between the first and second stakes on a first side of the plants. Finally, the method includes the step of wrapping the string around the second stake.

One advantage of the string feeding device in accordance with the present invention is that potential string entanglement is greatly reduced. More specifically, string entanglement within the string container is reduced because the string is fed from the center of the spool of string. Another advantage of the present invention is that string entanglement along the exterior of the device with plants and other objects is reduced since the string is fed primarily through the interior of the tube rather than being fed along the exterior of the tube.

These and other features, objects and advantages of this invention will become apparent to one skilled in the art from the following detailed description and the accompanying drawings illustrating features of this invention by way of example.

DETAILED DESCRIPTION OF THE PREFERRED EMBODIMENTS

Figure 3:
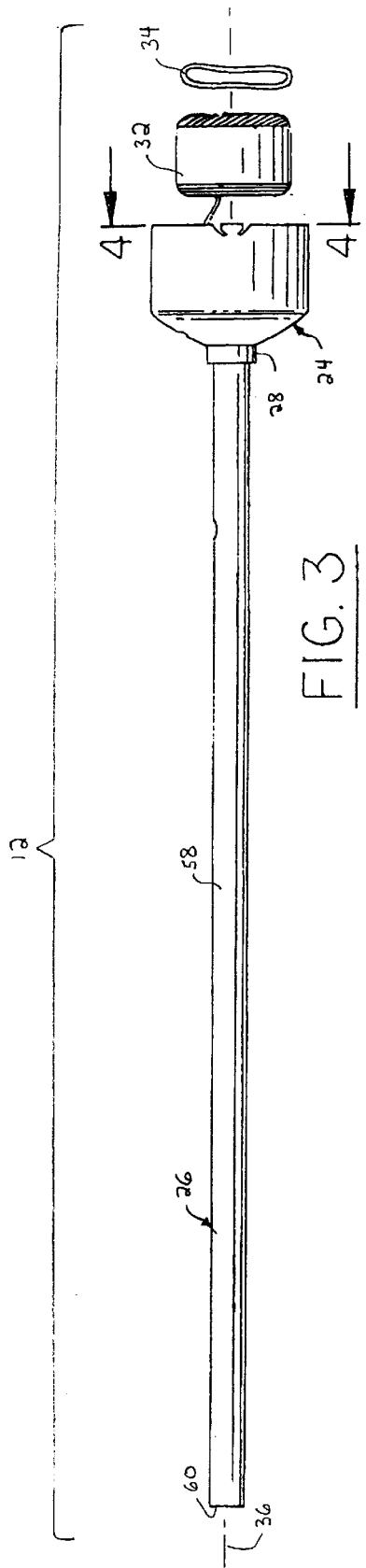
FIG. 3 is an exploded elevational view of a string feeding device in accordance with a first embodiment of the present invention.
Figure 1:
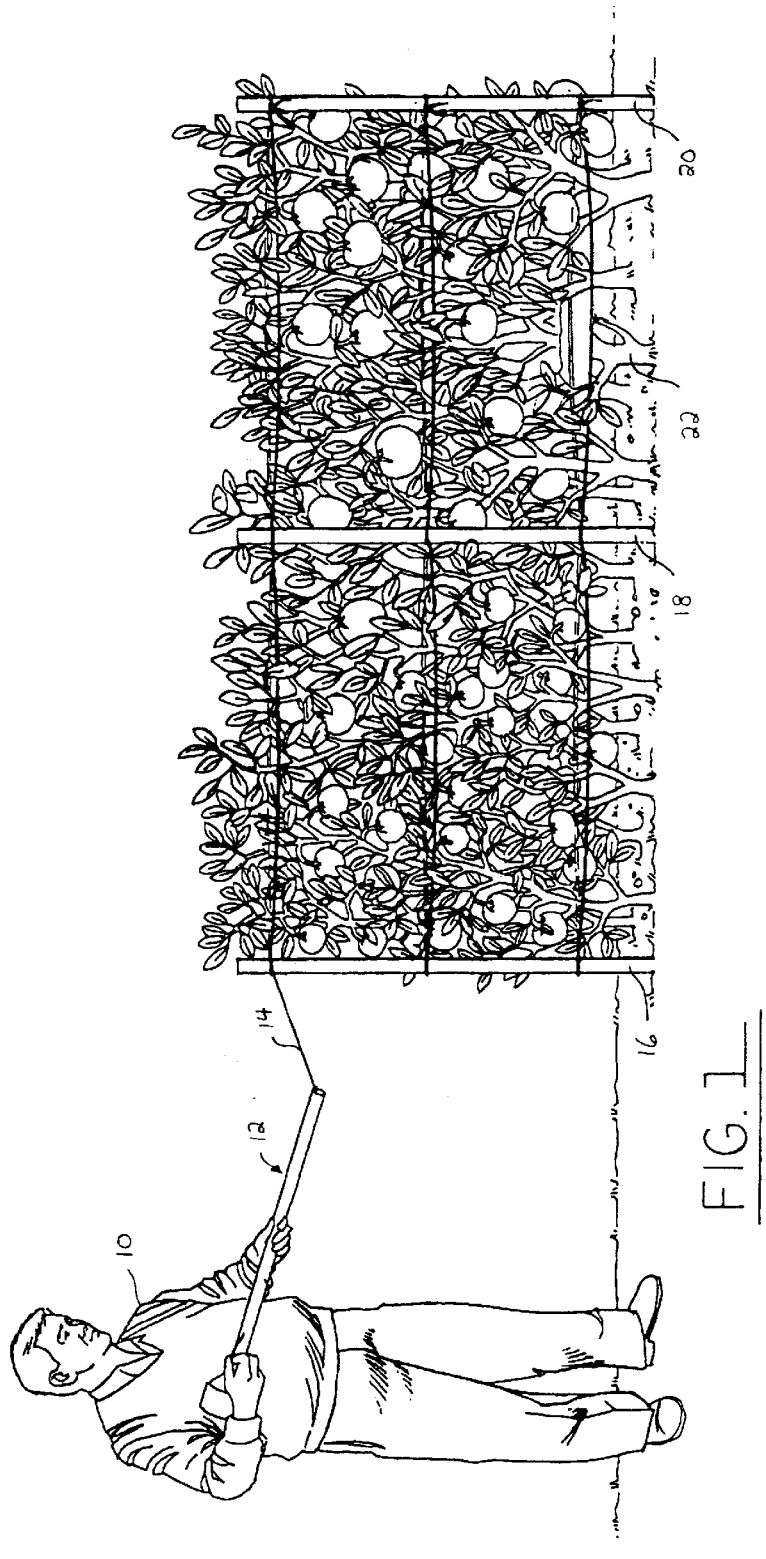
FIG. 1 is a perspective environmental view of a string feeding device in accordance with the present invention disposed in its operative position by a workman.
Figure 6:
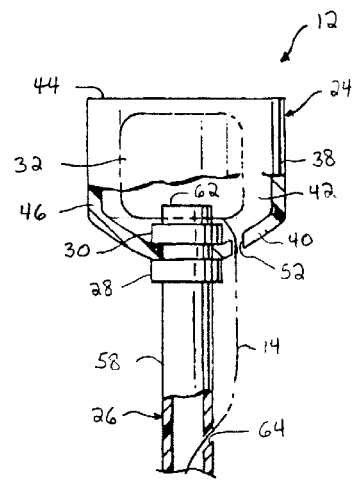
FIG. 6 is a partial sectional view of the string feeding device of FIG. 3.

Referring now to the drawings wherein like reference numerals are used to identify identical components in the various views, FIG. 1 shows a workman 10 using string feeding device 12 in accordance with a first embodiment of the present invention. Device 12 dispenses string 14 between stakes 16, 18, 20 to support tomato plants 22. Although the illustrated string feeding device is used to dispense string for supporting tomato plants, it should be understood that device 12 could dispense string for supporting other types of plants. Referring to FIGS. 3 and 6, device 12 includes a string container 24, a tube 26, sleeves 28, 30, a spool of string 32, and a flexible band 34.

Referring to FIG. 3, container 24 is provided to hold spool 32 therein and may be constructed from a plurality of materials including woods, metals, and plastics. Container 24 may extend along longitudinal axis 36 and may be centered about axis 36. Referring to FIG. 6, container 24 may include a generally tubular wall 38 and a bottom wall 40 forming a cavity 42 for receiving spool 32. It should be understood that although container 24 has a generally circular cross-sectional shape, container 24 may be constructed in a plurality of different cross-sectional shapes and sizes. For example, container 24 may be constructed with a rectangular or triangular cross-sectional shape, as long as it is of sufficient size to receive spool 32. Further, device 12 may include a cap (not shown) configured to attach to the top of container 24 to hold spool 32 therein.

Figure 4:
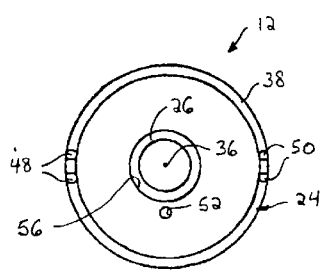
FIG. 4 is an end view of the string feeding device of FIG. 3 in the direction of arrows 4 without showing a spool of string disposed therein.
Figure 5:
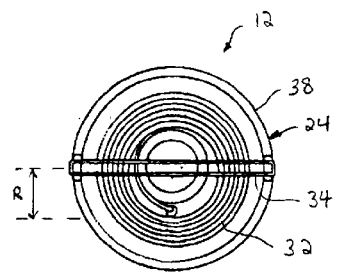
FIG. 5 is an end view of the string feeding device of FIG. 3 in the direction of arrows 4 showing a spool of string disposed therein.

Referring to FIGS. 4, 5, and 6, wall 38 may be generally circularly shaped and include a first end 44 which is open and a second end 46 which is substantially closed by bottom wall 40. Wall 38 may further include first and second pair of notches 48, 50 that are configured to hold a flexible band 34 therebetween. Band 34 fixedly holds spool 32 within container 24. Notches 48, 50 may extend from end 44 of wall 38 into wall 38.

Bottom wall 40 is fixed to end 46 of wall 38 and defines cavity 42 for holding spool 32 therein. Wall 40 preferably includes a hole 52 extending therethrough for allowing string 14 to be fed from container 24. Referring to FIGS. 4 and 5, hole 52 is preferably disposed a predetermined radial distance from axis 36 that is less than or equal to an inner radius "R" of spool 32. The primary advantage of placing hole 52 at a radial distance less than or equal to "R" is that string 14 may be fed from the center of spool 32 which reduces the likelihood of string entanglement within container 24 during the dispensing of string 14. Although hole 52 in the illustrated embodiment extends through wall 40, it should be understood that hole 52 may be disposed in a plurality of other locations. For example, hole 52 may be extend through wall 38 instead of wall 40. Also, hole 52 may be defined by a gap (not shown) between walls 38 and 40. Referring to FIG. 4, wall 40 may further include a hole 56 configured to receive tube 26. It should be understood that although hole 56 is centered about axis 36 in the illustrated embodiment, hole 56 may be disposed in a plurality of other locations through wall 40 or wall 38.

Figure 2:
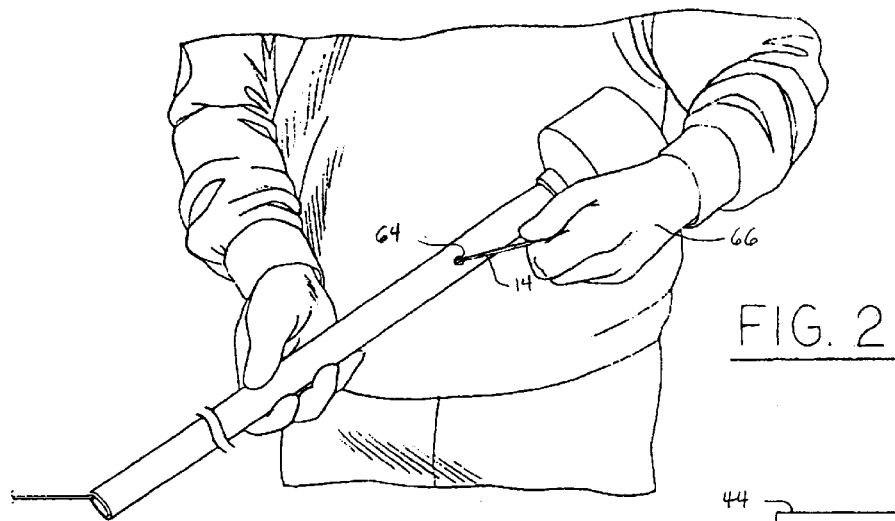
FIG. 2 is a perspective view of the string feeding device in accordance with the present invention showing a workman adjusting the tension of the string exiting therefrom.

Referring to FIGS. 3 and 6, tube 26 provides a conduit for easily dispensing string 14 between stakes 16, 18, 20 at various heights without requiring a workman to stoop over. Tube 26 may be constructed from a plurality of materials including woods, plastics, and metals. Tube 26 may extend generally longitudinally along axis 36 and include a side 58, a first end 60, a second end 62, and a hole 64. Hole 64 may extend through side 58 of tube 26 to allow string 14 from container 24 to be fed through an interior of tube 26. Referring to FIGS. 2 and 6, hole 64 is preferably disposed proximate to end 62 of tube 26. However, hole 64 should be longitudinally disposed a sufficient distance from container 24 to allow a workman's hand 66 to grasp string 14 to allow the tension of string 14 to be adjusted while string 14 is being dispensed. It should be understood that it is desirable to allow a workman to be able to tension string 14 to ensure that excess string is not being dispensed. It is also desirable to adjust the tension of string 14 during the dispensing thereof to ensure string 14 is wrapped relatively tightly around stakes 16, 18, 20. Hole 64 preferably extends into side 58 of tube 26 at an acute angle with respect to axis 36 to allow string 14 to easily pass therethrough. Referring to FIG. 4, tube 26 extends through hole 56 of container 24 and is fixedly attached at end 62 to container 24. Alternately, tube 26 may be formed integrally (not shown) with container 24.

Referring to FIG. 6, sleeves 28, 30 are provided to fixedly attach tube 26 to container 24 and are configured to be slidably received on tube 26. Sleeves 28, 30 may be constructed from a plurality of materials including woods, metals, and plastics. Sleeves 28, 30 are fixedly attached to tube 26 on each side of wall 40 of container 24, respectively, to thereby secure tube 26 to container 24. Sleeves 28, 30 may be fixedly attached to tube 26 using a plurality of means. For example, sleeves 28, 30 may be adhesively joined to tube 26 using conventional glues or epoxies or may be weldably joined to tube 26.

Spool of string 32 is conventional in the art and provides string 14 of suitable quality and strength to support plants dispersed between stakes. Spool 32 is disposed within container 24 and may be held within container 24 using flexible band 34. String 14 is preferably fed from the center of spool 32 to minimize the possibility of string entanglement within container 24. String 14 from spool 32 is preferably fed from cavity 42 through hole 52 of container 26 to exit container 26. String 14 is further preferably fed through hole 64 of tube 26 and through the interior of tube 26 to thereby exit end 60. It should be understood, that spool 32 could be replaced with a ball of string (not shown) or other spool configurations known in the art.

Figure 7:
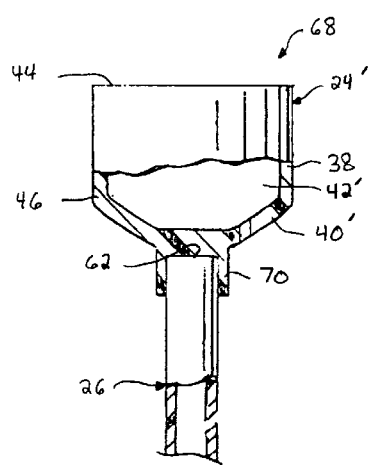
FIG. 7 is a partial sectional view of a string feeding device in accordance with a second embodiment of the present invention.

Referring now to FIG. 7, a string feeding device 68 in accordance with a second embodiment of the present invention is illustrated. Device 68 includes a string container 24', a tube 26, spool 32 (not shown in FIG. 7), and flexible band 34 (not shown in FIG. 7). It should be understood that device 68' is substantially similar to device 12. The primary difference between device 68 and device 26 is the means used to attach tube 26 to the remaining portion of the respective device.

Container 24' is provided to hold spool 32 therein. Container 24' includes wall 38 and a bottom wall 40' forming a cavity 42' for receiving spool 32 therein. In an alternate embodiment, device 68 may include a cap (not shown) configured to attach to the top of container 24' to hold spool 32 therein. Bottom wall 40' is fixed to end 46 of wall 38 to define cavity 42'. Wall 40' includes a stud mount portion 70 extending generally longitudinally therefrom and configured to receive tube 26. More specifically, portion 70 defines a cavity so that end 62 of tube 26 may be received therein.

Portion 70 may be joined to tube 26 using a plurality of means. For example, portion 70 may be adhesively joined to tube 26 using conventional glues or epoxies. Alternately, portion 70 may be weldably joined to tube 26.

Figure 8:
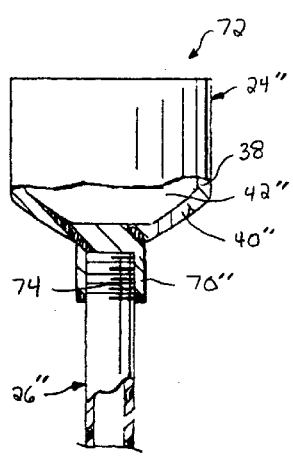
FIG. 8 is a partial sectional view of a string feeding device in accordance with a third embodiment of the present invention.

Referring now to FIG. 8, a string feeding device 72 in accordance with a third embodiment of the present invention is shown. Device 72 includes a string container 24", a tube 26", spool 32 (not shown in FIG. 8), and flexible band 32 (not shown in FIG. 8). It should be understood that device 72 is substantially similar to device 68. The primary difference between device 72 and device 68 is the means used to attach tubes 26", 26, respectively, to containers 24", 24' respectively.

Container 24" is provided to hold spool 32 therein. Container 24" includes wall 38 and a bottom wall 40" forming a cavity 42" for receiving spool 32 therein. In an alternate embodiment, device 72 may include a cap (not shown) configured to attach to the top of container 24" to hold spool 32 therein.

Bottom wall 40" of device 72 is substantially similar to wall 40' of device 68. The primary difference between wall 40" and wall 40' is that stud mount portion 70" of wall 40" is threadably joined to tube 26" instead of being adhesively joined to tube 26". More specifically, tube 26" and portion 70" include corresponding threads 74 for fixedly attaching tube 26" to portion 70".

Figure 9:
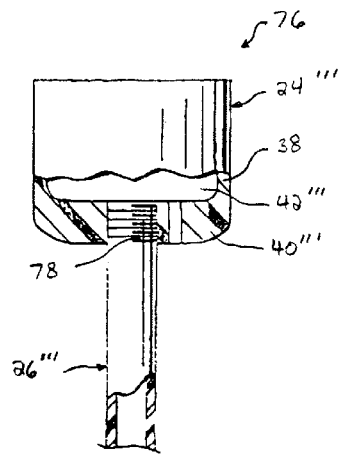
FIG. 9 is a partial sectional view of a string feeding device in accordance with a fourth embodiment of the present invention.

Referring now to FIG. 9, a string feeding device 76 in accordance with a fourth embodiment of the present invention is shown. Device 76 includes a string container 24'", a tube 26'", spool 32 (not shown in FIG. 9), and flexible band 34 (not shown in FIG. 9). It should be understood that device 9 is substantially similar to device 12. The primary difference between device 76 and device 12 is the means used to attach tubes 26'", 26 respectively to containers 24'", 24 respectively.

Container 24'" is provided to hold spool 32 therein. Container 24'" includes wall 38 and a bottom wall 40'" forming a cavity 42'" for receiving spool 32 therein. In an alternate embodiment, device 76 may include a cap (not shown) configured to attach to the top of container 76 to hold spool 32 therein.

Bottom wall 40'" of device 76 is substantially similar to wall 40 of device 12. The primary difference between wall 40'" and wall 40 is that wall 40'" is threadably joined to tube 26'". More specifically, tube 26'" and wall 40'" include corresponding threads 78 for fixedly attaching tube 26'" to wall 40'". As illustrated, wall 40'" may have a greater thickness than wall 38. Alternately, wall 40'" and may have an equal thickness (not shown in FIG. 9) than wall 38.

Referring now to FIGS. 1 and 6, a method for dispensing string between first and second stakes to support plants in accordance with the present invention will be described. Although a method in accordance the present invention will be described using device 12, it should be understood that the method could be implemented using devices 68, 72, and 78. The method includes the step of providing string container 24 disposed about axis 36. The method further includes the step of providing tube 26 fixedly attached to container 24 with tube 26 having hole 64 extending through side 58 of tube 26. The method further includes the step of providing spool 32 disposed within container 24. The method further includes the step of feeding string 14 from spool 32 disposed within container 24 through hole 64. The method further includes the step of feeding string 14 through an interior of tube 26 to thereby exit end 60 of tube 26. The method further includes the step of tying string 14 to stake 16. The method further includes the step of dispensing string 14 between stakes 16, 18 on a first side of plants 22. Finally the method includes the step of wrapping string 14 around stake 18. Workman 10 may wrap string 14 around stake 18 by making a circular motion with end 60 of tube 26 around stake 18.

Although the preceding steps involved dispensing string between two stakes, it should be understood that if additional stakes were utilized down a row of plants, the string would be wrapped around each successive stake in the row. For example, workman 10 could further dispense string 14 between stakes 18, 20 and wrap string 14 around stake 20. Referring to FIG. 1, successive levels of string 14 between stakes 16, 18, 20 are shown for supporting mature plants 22. However, it should be understood that for relatively young plants (not shown), a single level of string 14 between stakes 16, 18, 20 may suffice to support plants 22. Further, as the plants grow upwardly, additional levels of string 14 may be dispensed at predetermined intervals as shown in FIG. 1. For plants 22, each level of string 14 may be spaced approximately eight to ten inches apart.

To support plants disposed between adjacent stakes, it is desirable to have a string extending between adjacent stakes on each side of the plants. Accordingly, the method in accordance with the present invention may include the step of dispensing string 14 between stakes 18, 16 on a second side of plants 22. The method may further include the steps of cutting string 14 and tying string 14 to stake 16.

A string feeding device and a method for dispensing string to support plants in accordance with the present invention represent a substantial improvement over known devices and methods. The inventive device feeds string from the center of a spool of string to reduce the likelihood of string entanglement within the string container. Further, the inventive device directs string primarily through the interior of the device rather than along the exterior of the tube to thereby reduce string entanglement with plants and other objects. Further, the device dispenses string from an end of a tube which essentially eliminates string entanglement with the device itself. Finally, the device is configured to allow a workman to easily adjust the tension of the string during the dispensing of the string. Accordingly, a workman has the ability to tightly wrap the string around stakes to adequately support the plants disposed between the stakes.

While the invention has been particularly shown and described with reference to the preferred embodiments thereof, it is well understood by those skilled in the art that various changes and modifications can be made in the invention without departing from the spirit and scope of the appended claims.

We claim:

1. A string feeding device for dispensing string, comprising:
    a string container being disposed about a longitudinal axis;
    a longitudinally extending tube having first and second ends, said first end of said tube being fixedly attached to said string container, said tube including a first hole extending through a side of said tube wherein said string is fed from said string container through said first hole in said side of said tube and is further fed through an interior of said tube to thereby exit said second end of said tube.

2. The string feeding device of claim 1, wherein said string container includes a bottom wall.

3. The string feeding device of claim 2 wherein said bottom wall of said string container includes a first hole extending therethrough, said first hole of said string container is disposed a predetermined radial distance from said longitudinal axis, said predetermined radial distance being less than or equal to an inner radius of a spool of string held within said string container.

4. The string feeding device of claim 2, further comprising first and second attachment sleeves configured to be initially slidably received on said tube, said string container having a first hole extending through said bottom wall that is configured to receive said tube, wherein said first and second attachment sleeves are fixedly attached to said tube on each side of said bottom wall, respectively, to thereby secure said tube to said string container.

5. The string feeding device of claim 2, wherein said bottom wall of said string container includes a stud mount portion extending longitudinally therefrom, said stud mount portion being configured to receive said tube.

6. The string feeding device of claim 5, wherein said stud mount portion of said bottom wall of said string container is adhesively joined to said tube.

7. The string feeding device of claim 5, wherein said stud mount portion of said bottom wall of said string container is weldably joined to said tube.

8. The string feeding device of claim 5, wherein said stud mount portion of said bottom wall of said string container is threadably joined to said tube.

9. The string feeding device of claim 2, wherein said bottom wall of said string container is threadably joined to said tube.

10. The string feeding device of claim 2, wherein said string container includes a longitudinally extending generally tubular wall having first and second ends, said bottom wall being fixed to said first end of said tubular wall, said tubular wall and said bottom wall defining a cavity for receiving said string.

11. The string feeding device of claim 10, wherein said string container includes first and second pair of notches extending from said second end of said tubular wall into said tubular wall, said first and second pair of notches being configured to hold a flexible band therebetween to secure said string within said string container.

12. The string feeding device of claim 1, wherein said first hole extending through said side of said tube is disposed proximate to said first end of said tube.

13. The string feeding device of claim 12, wherein said first hole extending through said side of said tube extends into said side at an acute angle with respect to said longitudinal axis.

14. A string feeding device, comprising:
a string container being disposed about a longitudinal axis and having a bottom wall with a first hole extending therethrough;
a longitudinally extending tube having first and second ends, said first end of said tube being fixedly attached to said bottom wall of said string container, said tube including a first hole extending through a side of said tube; and
a spool of string disposed within said string container wherein string from said spool of string is fed through said first hole of said string container and said first hole of said tube and is further fed through an interior of said tube to thereby exit said second end of said tube.

15. The string feeding device of claim 14, wherein said first hole extending through said bottom wall of said string container is disposed a predetermined radial distance from said longitudinal axis, said predetermined radial distance being less than or equal to an inner radius of said roll of string held within said string container.

16. The string feeding device of claim 14, further comprising first and second attachment sleeves configured to be initially slidably received on said tube, said string container having a second hole extending through said bottom wall that is configured to receive said tube, wherein said first and second attachment sleeves are fixedly attached to said tube on each side of said bottom wall, respectively, to thereby secure said tube to said string container.

17. The string feeding device of claim 14, wherein said bottom wall of said string container includes a stud mount portion extending longitudinally therefrom, said stud mount portion being configured to receive said tube.

18. The string feeding device of claim 14, wherein said string container includes a longitudinally extending generally tubular wall having first and second ends, said bottom wall being fixed to said first end of said tubular wall, said tubular wall and said bottom wall defining a cavity for receiving said roll of string.

19. A method of dispensing string between first and second stakes to support plants, comprising the steps of:
providing a string container disposed about a longitudinal axis;
providing a generally longitudinally extending tube fixedly attached to said string container, said tube having a first hole extending through a side of said tube;
providing a spool of string disposed within said string container;
feeding string from said spool of string disposed within said string container through said first hole extending through said tube;
feeding said string through an interior of said tube to thereby exit a first end of said tube;
tying said string to said first stake;
dispensing said string between said first and second stakes on a first side of said plants; and
wrapping said string around said second stake.

20. The method of claim 19, further comprising the steps of:
dispensing said string between said first and second stakes on a second side of said plants;
cutting said string; and
tying said string to said first stake.

* * * * *